July 11, 1961 R. R. THALNER 2,992,359

CATHODE RAY BEAM DEFLECTION CIRCUIT

Filed Dec. 24, 1954

INVENTOR.

Robert R. Thalner

BY

Mason, Kolehmainen, Rathburn & Wyss

ATTORNEYS.

United States Patent Office 2,992,359

Patented July 11, 1961

2,992,359
CATHODE RAY BEAM DEFLECTION CIRCUIT

Robert R. Thalner, Buffalo, N.Y., assignor, by mesne assignments, to Sylvania Electric Products, Inc., Wilmington, Del., a corporation of Delaware Filed Dec. 24, 1954, Ser. No. 477,540
2 Claims. (Cl. 315—27)

Figure 1:
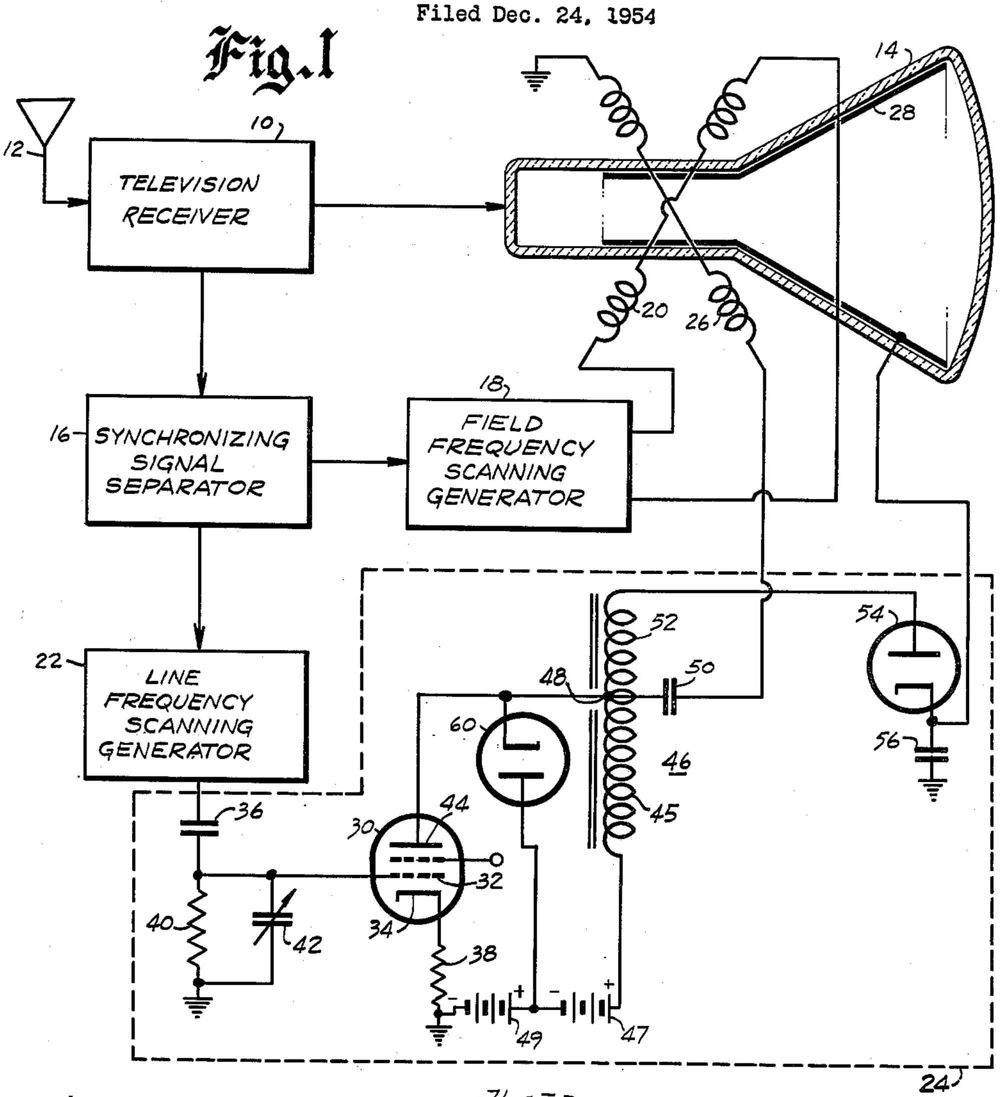

The present invention relates to a cathode ray beam deflection circuit, more particularly to a combination type deflection circuit which supplies both a beam deflection signal and a high unidirectional beam accelerating potential, and has for a principal object the provision of a combination deflection circuit which is more simple and reliable than those heretofore known in the prior art.

The horizontal scanning amplifier of a conventional television receiver ordinarily supplies a current of sawtooth waveform to a horizontal deflection yoke positioned about the neck of a cathode ray tube type image reproducing device, thereby to effect horizontal deflection of the cathode ray beam of the tube. The horizontal deflection winding is ordinarily coupled to the horizontal output tube through a transformer which includes a high voltage tertiary winding which is used to develop high voltage pulses during the horizontal retrace intervals. This pulse wave is supplied to a rectifying system which derives therefrom a high unidirectional voltage for use in energizing an accelerating anode of the image reproducing device.

In order effectively to eliminate oscillations in the deflection circuit following each flyback pulse while permitting the derivation of the high unidirection energizing potential therefrom, a damping diode is ordinarily connected across the output terminals of the horizontal output transformer. For class B operation this diode is normally non-conductive during the latter portion of the trace period and conductive during the retrace period and the initial portion of the trace period. With certain types of deflection and high voltage producing circuits, it has been found that the leakage reactance of the horizontal transformer and the associated circuit capacitors form a series resonant circuit which oscillates at the natural resonant frequency thereof and is of sufficiently low impedance to affect the damping diode so that it becomes intermittently non-conductive during the trace interval. Consequently, the current in the scanning yoke is rendered nonlinear and objectionable bright lines are produced on the face of the cathode ray tube.

Another object of the present invention is, therefore, to provide a new and improved cathode ray beam deflection circuit for a television picture tube wherein sustained oscillations in the high unidirectional voltage developing circuit are effectively eliminated.

A further object of the present invention is to provide a new and improved, simplified and yet reliable cathode ray beam deflection circuit in which oscillations in the high voltage producing circuits are prevented from adversely affecting the operation of the deflection circuit.

Briefly in accordance with the present invention, there is provided a scanning signal amplifier and high voltage supply circuit which includes a horizontal output amplifier having an input circuit connected to be supplied with a scanning signal. The output of the horizontal output amplifier is coupled through an output transformer to the deflection scanning yoke. A tertiary winding is provided on the transformer for use in developing a high unidirectional voltage in response to the high voltage retrace pulse of energy which appears in the principal transformer winding when the horizontal output amplifier is cut off. A damping diode is connected across the deflection signal output terminals of the transformer and operates to supply the initial portion of the sweep signal and to eliminate the deflection circuit oscillatory currents which would ordinarily flow in the deflection apparatus following the retrace pulse. In order to increase the efficiency of operation of the deflection circuit, the tertiary winding of the output transformer is formed of a high resistance material such that this winding has a relatively low Q, thereby effectively to eliminate ringing in the damper tube circuit.

Figure 2:
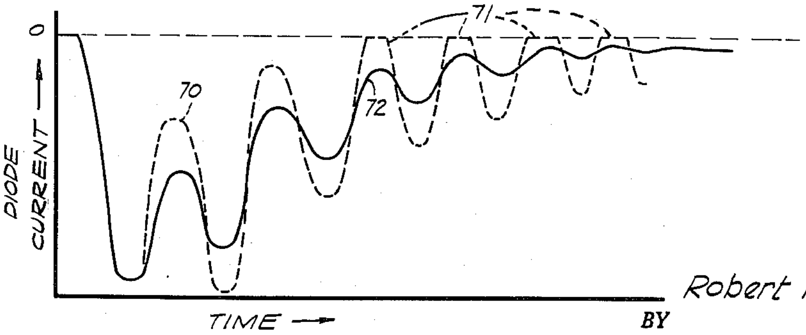

The invention, both as to its organization and method of operation, together with further objects and advantages thereof will best be understood by reference to the following detailed description taken in connection with the accompanying drawings, in which:

FIG. 1 is a circuit diagram, partly schematic, of a television receiver embodying the combination high voltage and horizontal deflection circuit of the present invention in its preferred form; and FIG. 2 is a graph representing certain operating conditions of the damping diode in the circuit arrangement of FIG. 1 and which is used as an aid in explaining the operation of the present invention.

Referring now to the drawing and more particularly to FIG. 1, the television receiver there shown includes a unit 10 having an input circuit coupled to a conventional antenna 12 and an output circuit coupled to the intensity control electrodes of a cathode ray tube type of image reproducer 14. Unit 10 is conventional and includes a high frequency amplifier, a video detector, and a video amplifier. The picture signal developed in the output circuit of the video detector of unit 10 is applied to a synchronizing signal separator 16 where the synchronizing signal components of the picture signal are separated from each other and from the video components thereof, the vertical synchronizing components being supplied to control the synchronized operation of a field frequency scanning generator 18. The output circuit of the latter is coupled to a vertical deflection winding 20 of a scanning yoke positioned in the conventional manner about the neck of the image reproducing device 14. The horizontal synchronizing components, separated from the television signal by the synchronizing signal separator 16, are similarly applied to a line frequency scanning generator 22 to control the synchronized operation thereof. The unit 22 is conventional and the output circuit thereof is coupled to a line scanning amplifier and high voltage supply 24. The scan output circuit of unit 24 is coupled to a horizontal scanning winding 26 of the deflection yoke, and the high voltage output circuit of the unit 24 is coupled to the anode 28 of the image reproducer device 14.

With the exception of the scanning amplifier and high voltage supply 24, the construction and operation of the television receiver thus far described is conventional in that a television signal received by the antenna 12 is applied to unit 10 where it is amplified, detected and again amplified after detection and before being used to control the intensity of the cathode ray beam of the image reproducing device 14. The vertical and horizontal synchronizing components of the received signal are separated by the separator 16 and are applied to the scanning system 18 and to a source of horizontal scanning signals 22 to control the synchronized operations thereof. The scanning signal supplied from the output circuit of the unit 18 to the vertical scanning winding 20 and the scanning signal supplied to the horizontal scanning winding 26 through the unit 24 from the line frequency scanning generator 22 cause the cathode ray beam of the tube 14 to trace a raster of horizontal lines to reproduce the television image.

Referring now more particularly to the portion of the receiver embodying the present invention, the unit 24 includes a horizontal sweep voltage amplifier tube 30 having an input circuit including a control electrode 32 and cathode 34, the electrode 32 being connected through a capacitor 36 to the output circuit of the line-frequency scanning generator 22. The cathode 34 is connected to ground through a resistive impedance 38, and a grid leak resistor 40 is connected between the control electrode 32 and ground. A variable capacitor 42 is connected in parallel with the grid leak resistor 40 so as to provide a convenient means for varying the amplitude of the scanning signal applied from the generator 22 to the input electrodes of the discharge device 30 and, consequently, to control the width of the image reproduced on the screen of the picture tube 14. The amplifier tube 30 also includes an anode 44 which is coupled through a winding 45 of an output transformer 46 to a source of power energization voltage indicated as the series connected batteries 47 and 49.

In the embodiment of the invention illustrated, the transformer 46 is of the autotransformer type and the output is taken across the winding 45 at a tap 48 which coincides with the point at which the output scanning wave from the amplifier 30 is supplied to the transformer 46. The tap 48 is, therefore, capacitively coupled through a capacitor 50 to the horizontal scanning winding 26 to scan the cathode ray beam of the tube 14 in the usual manner. The transformer 46 also includes a high voltage tertiary winding 52 which is connected through a diode rectifier discharge device 54 and a filtering capacitor 56 to ground. A high unidirectional accelerating potential is thus derived across the capacitor 56 and supplied to the accelerating anode 28 of the image reproducing discharge device 14 to provide an energizing potential therefor. A conventional class B damping and efficiency diode circuit is provided and includes a diode rectifier 60 which is connected to the junction of the batteries 47, 49 and is so poled as to conduct conventional current from the battery 49 to the anode 44. It will be appreciated that in view of the fact that an autotransformer is used to couple the scanning signal from the discharge device 30 to the horizontal deflection winding 26, the diode 60 is effectively coupled in the output circuit of the transformer 46.

Considering now the operation of the scanning amplifier and high voltage supply as thus far described, the scanning voltage signal which is supplied to the input electrode of the discharge device 30 causes the device 30 to conduct during the last half of the trace portion of the scanning signal and to be non-conductive during the retrace portion and the first half of the trace portion. As is well known in the art, in order to return the cathode ray beam to the left hand edge of the viewing screen at the end of the trace interval, the amplifier 30 is cut off and a high reverse polarity pulse is devloped in the transformer 46. This high voltage pulse which occurs when the amplifier 30 is cut off is also utilized in the tertiary winding 52 to develop a high positive pulse of voltage across the capacitor 56 to provide the high cathode ray beam accelerating potential necessary for the proper operation of the picture tube 14. When the horizontal output tube 30 is cut off, the diode 60 conducts and places a low impedance across the primary winding 45 of the transformer 46. If unity coupling is achieved between the windings 45 and 52, the damping tube impedance of the diode 60 would also damp out oscillations in the winding 52. However, as a practical matter there is always some leakage reactance in the transformer 46 and this leakage reactance forms a series resonant circuit with the capacity to ground of the diode rectifier 54 and distributed capacity to ground of the winding 52. This series resonant circuit has a very low impedance at resonance and hence oscillations developed therein at the resonant frequency thereof are superimposed on the normal current flow through the diode 60 even though the impedance of the diode 60 itself is also low. If the amplitude of these superimposed oscillations is sufficiently large to reduce the damping diode current to zero, the shunting or current regulating effect of the diode is removed and these oscillations directly affect the scanning current flowing through the coils 26. As a result, the linearity of the horizontal scanning current is destroyed and objectionable bright lines are produced in the raster corresponding to the periods when the diode 60 is cut off by superimposed oscillations arising in the high voltage circuit. Thus, as shown in FIG. 2, the oscillations shown in dotted lines at 70 may be of sufficient amplitude that the diode 60 is cut off during the periods 71 and during these periods the current through the coils 26 becomes nonlinear.

In order to prevent the current through the diode 60 from being reduced to zero due to oscillations arising in the high voltage winding 52, there is provided in accordance with the present invention means for reducing the Q of the above described series resonant circuit so that the amplitude of the superimposed oscillations is reduced as the diode current approaches zero. More particularly, the winding 52 is formed of high resistance wire, such as Nichrome, so that the winding 52 has a relatively high resistance. The Q of the above described series resonant circuit is thereby lowered so that the superimposed oscillations die out rapidly, as shown by the full line curve 72 in FIG. 2. In this connection, it will be understood that FIG. 2 shows the waveform of the current through the diode 60 and this current may vary nonlinearly without rendering the scanning current through the coils 26 nonlinear, unless the diode current is reduced to zero, as indicated at 71. By winding the transformer winding 52 of high resistance wire distributed damping is provided so that series resonances which may arise due to distributed capacity of the winding 52 to ground are damped as well as the series resonant circuit which includes the rectifier tube circuit capacity. It has been found that when the winding 52 has a resistance in the order of 25,000 ohms the oscillations superimposed on the diode 60 are satisfactorily damped so that a linear scanning current is produced in the coils 26. However, it will be understood that the resistance of the winding 52 may vary depending upon the other circuit constants and the amplitude of superimposed oscillations which is considered objectionable. If desired, the Q of the above described series resonant circuit may also be lowered by constructing the core of the transformer 46 of iron having relatively high losses so that the undesired oscillations are damped out by the losses in the surrounding magnetic material rather than by the internal resistance of the winding 52.

While there has been described what is at present considered to be the preferred embodiment of the invention, it will be understood that various modifications may be made therein which are within the true spirit and scope of the invention as defined in the appended claims.

What is claimed as new and is desired to be secured by Letters Patent of the United States is:

1. In a television receiver, a scanning signal amplifier having an anode, a grid and a cathode; means connecting a source of scanning signals to the grid and cathode of said amplifier; an autotransformer having high and low alternating potential ends and an intermediate tapping point, the section of said autotransformer between said tapping point and the high alternating potential end of said transformer being made of wire of high resistivity; means connecting the anode of said amplifier to said tapping point and cathode of said amplifier to the low alternating potential end of said autotransformer; a diode damping device having its cathode connected to said tapping point and its anode to the low alternating potential end of said transformer; a high voltage diode rectifier, the anode of said rectifier being connected to the high alternating potential end of said autotransformer; and, a deflection circuit connected to said intermediate tapping point and the low alternating potential end of said autotransformer, said section of said transformer which is made of wire of high resistivity serving to damp out series resonances due to distributed capacity and leakage reactance of said section thereby eliminating the production of bright lines on the raster of said television receiver.

2. Apparatus as claimed in claim 1 characterized by the fact that the section of said autotransformer between said tapping point and said high alternating potential end is made of Nichrome.

References Cited in the file of this patent

UNITED STATES PATENTS

| | | |
|---|---|---|
| 1,801,479 | Ballentine | Apr. 21, 1931 |
| 2,470,197 | Torsch | May 17, 1949 |
| 2,521,158 | Gannaway et al. | Sept. 5, 1950 |
| 2,543,304 | Schwarz | Feb. 27, 1951 |
| 2,599,798 | Wissel | June 10, 1952 |
| 2,613,334 | Otis et al. | Oct. 7, 1952 |
| 2,639,319 | Torsch | May 19, 1953 |
| 2,665,393 | Bocciarelli | Jan. 5, 1954 |
| 2,678,413 | Adler et al. | May 11, 1954 |

FOREIGN PATENTS

| | | |
|---|---|---|
| 21,646 | Australia | Mar. 10, 1930 |
| 710,629 | Great Britain | June 16, 1954 |